(No Model.)
H. BROOME.
CLUTCH.
No. 510,886. Patented Dec. 19, 1893.
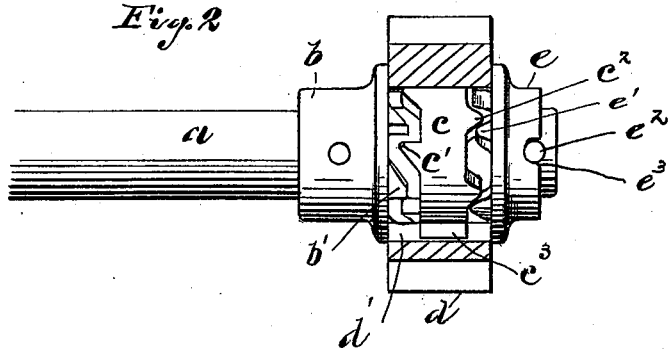
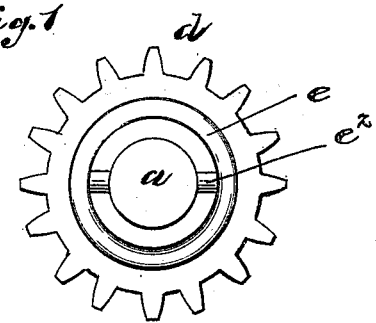
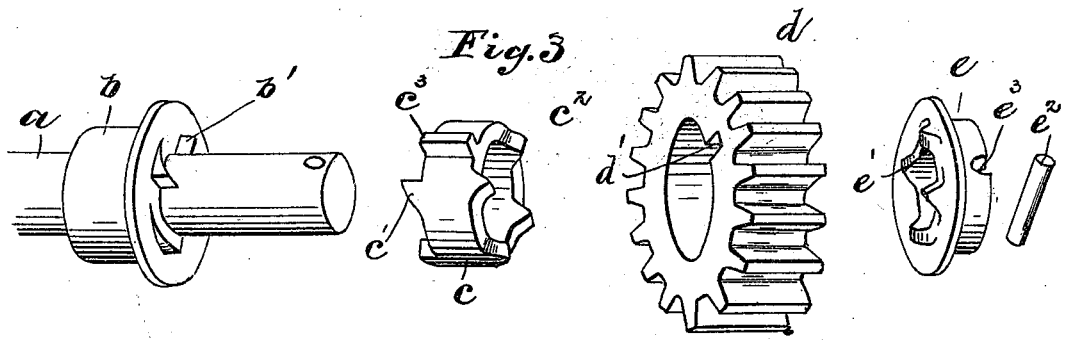
WITNESSES:
Frank Watt
Wm. G. Maler
INVENTOR
Henry Broome
BY
Philip F. Shepherd
ATTORNEYS

UNITED STATES PATENT OFFICE.

HENRY BROOME, OF SPRINGFIELD, OHIO, ASSIGNOR TO AMOS WHITELEY, OF SAME PLACE.

CLUTCH.

SPECIFICATION forming part of Letters Patent No. 510,886, dated December 19, 1893.

Application filed March 18, 1893. Serial No. 466,621. (No model.)

*To all whom it may concern:*

Be it known that I, HENRY BROOME, a citizen of the United States, residing at Springfield, in the county of Clark, and State of Ohio, have invented certain new and useful Improvements in Clutches for Lawn-Mowers, of which the following is a specification.

My invention relates to improvements in clutches, especially adapted for use with lawn mowers.

The object of my invention is to provide a construction of parts the employment of which will cause the driving wheel to be positively engaged with the driven shaft when turned in one direction, and disengaged therefrom and turn freely thereon when turned in the opposite direction.

My invention consists in the various constructions and combinations of parts hereinafter described and pointed out in the claims.

In the accompanying drawings Figure 1 is a front elevation of a device embodying my invention. Fig. 2 is an elevation, partly in section, of the same. Fig. 3 is a view of the various parts illustrated in the relative positions for assembling.

Like parts are represented by similar letters of reference in the several views.

In the said drawings, $a$ represents a shaft corresponding to the reel shaft of a lawn mower; $b$, is a collar secured rigidly thereto and provided on one face with ratchet teeth $b'$, and which I shall term the ratchet collar. Arranged loosely on the shaft, adjacent to the ratchet collar $b$, is a sleeve $c$, provided at one end with ratchet teeth $c'$, corresponding to the teeth $b'$, in the ratchet collar $b$, and provided on the opposite end with beveled projections $c^2$, similar to the ratchet teeth $c'$, except that where the ratchet teeth $c'$, have one beveled approach and one straight bearing surface, the teeth $c^2$, are beveled on each side. The collar $c$, is further provided with a radial projection or rib $c^3$, on its outer periphery.

The driving pinion $d$, is bored out or otherwise provided with a central opening adapted to fit over the outer periphery of the sleeve $c$, and is provided with a notched recess $d'$, adapted to slip over the engaging lug $c^3$, of said sleeve so as to permit a free lateral movement of said sleeve with reference to said pinion, but furnish a positive driving connection, so that the parts will always rotate together in either direction. The pinion $d$, is held against lateral movement in one direction by the ratchet collar $b$, and in the opposite direction by the removable collar $e$, which is provided on its inner face with beveled teeth or projections $e'$, corresponding to the teeth or projections $c^2$, on the laterally moving collar $c$. This removable collar $b$ is held in place preferably by a removable pin $e^2$, which extends through the shaft $a$, and engages in oppositely arranged notched openings $e^3$, in the removable collar $e$.

The operation, it is thought, will be readily understood from the foregoing. As the pinion is revolved in a forward direction, carrying with it the clutch sleeve $c$, said sleeve is forced laterally by the beveled projections $e'$, and $c^2$, so as to cause the ratchet teeth thereon to engage with the ratchet teeth in the ratchet collar $b$. When the pinion is turned in the reverse direction the beveled approaches of the ratchet teeth will cause the sleeve to move laterally on the shaft until it engages the beveled approaches of the teeth on the opposite end, when it will be again forced laterally in the direction of the ratchet teeth, and will thus vibrate back and forth between the respective collars as long as the pinion is turned in the reverse direction; the lateral movement caused by the beveled projections being sufficient to insure the engagement of the ratchet teeth whenever the pinion is moved in a forward direction.

Having thus described my invention, I claim—

1. A clutch for lawn mowers, consisting essentially of a supporting shaft having a fixed collar thereon with ratchet teeth, a removable collar also secured to said shaft opposite to said fixed collar, a loose sleeve on said shaft between said fixed and removable collars, said sleeve being provided at one end with ratchet teeth corresponding to the teeth in said fixed collar, and at the other with beveled projections adapted to be engaged by similar projections on said removable collar, a driving pinion between said collars, said pinion being fitted to said sleeve so as to permit a longitudinal movement of said sleeve through said pinion, the construction of said sleeve and pinion being such as to cause them to revolve together, substantially as and for the purpose specified.

2. The combination of the shaft and the fixed collar having ratchet teeth thereon, the removable collar having beveled teeth or projections, a laterally moving clutch sleeve between the said collars having ratchet teeth and beveled projections on its opposite ends to correspond to the adjacent projections in the respective collars, said clutch sleeve being provided with a radial projection on its periphery, a driving pinion adapted to fit over said sleeve and provided with a notched recess to engage said radial lug, said pinion being held against lateral movement in either direction by the respective collars, substantially as specified.

In testimony whereof I have hereunto set my hand this 1st day of March, A. D. 1893.

HENRY BROOME.

Witnesses:
ROBERT C. RODGERS,
FRANK WATT.